Feb. 28, 1956  L. C. RUBIN  2,736,064
EXTRUSION MOLDING OF PERFLUOROCHLOROCARBON PLASTICS
Filed Nov. 25, 1953
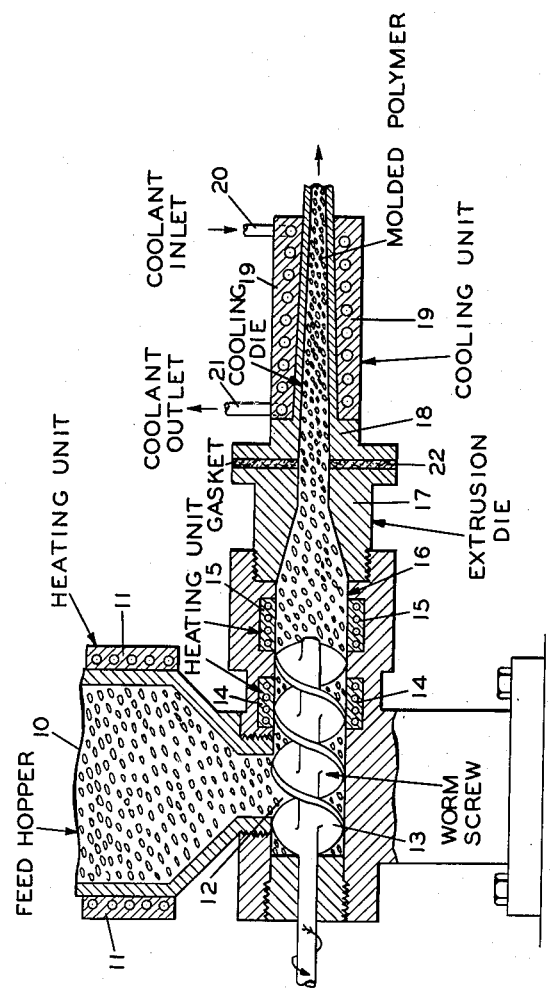
INVENTOR
LOUIS C. RUBIN
BY H. H. Palmer
Benjamin J. Kaufman
ATTORNEYS

United States Patent Office

2,736,064
Patented Feb. 28, 1956

2,736,064

EXTRUSION MOLDING OF PERFLUOROCHLOROCARBON PLASTICS

Louis C. Rubin, West Caldwell, N. J., assignor to The M. W. Kellogg Company, Jersey City, N. J., a corporation of Delaware Application November 25, 1953, Serial No. 394,300

16 Claims. (Cl. 18—55)

This invention relates to the treatment of perfluorochlorocarbon plastics, and more specifically to the treatment of polytrifluorochloroethylene plastics. In one aspect, the invention relates to the extrusion molding of polymers of trifluorochloroethylene for the purpose of forming articles of such material. More particularly in this aspect, the invention relates to the extrusion molding of polymers of trifluorochloroethylene for the purpose of forming articles of such material, and apparatus suitable for carrying out such extrusion molding.

This application is a continuation-in-part of my prior and co-pending application Serial No. 136,402, filed December 31, 1949, now abandoned.

The preparation of the monomer, trifluorochloroethylene, is accomplished by dechlorinating Freon 113 (1, 1-2 trifluorotrichloroethane), under suitable conditions of dehalogenation in the presence of a solvent, such as methyl alcohol, and a metallic dehalogenating agent, such as zinc dust, to produce an effluent comprising the monomer trifluorochloroethylene and solvent. This effluent is next passed to a suitable fractional distillation system in which substantially pure trifluorochloroethylene is recovered as a low-boiling fraction.

The monomer thus obtained, is polymerized under suitable polymerization conditions, with or without the presence of a suitable catalyst or promoter. Such conditions may comprise the use of a catalyst comprising an organic peroxide, such as bis-trichloroacetyl peroxide preferably dissolved in a suitable solvent, such as trichlorofluoromethane, at a temperature between about —20° C. and about 25° C., and preferably at a temperature of about —16° C. At a temperature of about —16° C., the polymerization of trifluorochloroethylene to the solid polymer, in a suitable yield, is accomplished in about seven days. At elevated temperatures, less time is required to complete the polymerization. After the desired extent of polymerization has taken place, the resulting polymerization reaction mixture is removed from the polymerization zone and the polymeric product is recovered from the solvent, and catalyst or polymerizing agent.

The polymers of trifluorochloroethylene possess certain desirable, physical and chemical characteristics, with four-fifths of the weight being supplied by the halogens, fluorine and chlorine. These polymers are colorless and transparent and have been found to possess a high chemical stability, with no effect being observed on the polymer (when employed as coatings, insulators, gaskets, or other articles of manufacture) after prolonged exposure to concentrated sulfuric, hydrofluoric and hydrochloric acid, strong caustic, fuming nitric acid, aqua regia, and other vigorous oxidizing materials. The polymer is hard but not brittle, and is flowable at temperatures above about 500° F. In addition, the polymer is flexible and resilient. In addition to excellent dielectric properties, these polymers are not wetted by and impervious to water, and not even a trace of water vapor can penetrate polytrifluorochloroethylene films of 0.003 inch or greater thickness. Solid polymers of the type disclosed herein, have been tested at temperatures ranging from 390° F. down to —320° F., and found to retain their flexibility, as well as the aforementioned other desirable properties, throughout this range, which is an unusually broad one for thermoplastic materials.

Although polytrifluorochloroethylene solids are insoluble in most of the common solvents and plasticizers, they may be plasticized with certain substances. The best plasticizers are lower polymers of the same material, having molecular weights of the order of 950. These are oily liquids which do not change the chemical properties of the thermoplastic material, in any way; however, the physical properties, especially temperature characteristics, are greatly affected by the incorporation of plasticizers in the solid polymers. Other suitable plasticizers include the completely fluorinated mineral oils. Hot-milling plasticizer and polymer together is the preferred method of introducing the plasticizer. The plasticized material is softer, more flexible and more rubbery than the pure solid polymer in proportion to the plasticizer content. In general, the plasticized product may contain up to 30 per cent plasticizer for most purposes, although in some instances it may be desirable to use up to 50 per cent, or higher, of the plasticizer, in some articles of manufacture. The aforementioned thermoplastic materials, can be made either transparent, translucent or opaque, and may also be blended with solid fillers and coloring agents, as desired.

As previously indicated, the aforementioned polytrifluorochloroethylene thermoplastic materials possess unusually high temperature characteristics. These temperature characteristics have heretofore prevented successful extrusion of these materials. In addition, great care is required in forming molded articles of these plastic materials, inasmuch as they tend to change their physical characteristics, in varying degrees, under the influence of the molding operation. Thus, prior to my invention, a generally satisfactory method for the successful extrusion of the aforementioned thermoplastic material has not been attained.

It is, therefore, an object of this invention to provide an improved method of extrusion molding, adapted to the forming of articles of polymers of trifluorochloroethylene. Another object of the invention is to provide suitable conditions for the extrusion molding of plasticized or unplasticized polymers of trifluorochloroethylene into smooth articles.

Still another object of the invention is to provide an improved method for the extrusion molding of articles of polymers of trifluorochloroethylene of selected properties.

Various other objects and advantages of the present invention will become apparent to those skilled in the art from the accompanying description and disclosure.

According to this invention, employing the extrusion molding apparatus, more specifically hereinafter described, a plastic composed essentially of polytrifluorochloroethylene, prepared in granular or powdered form in accordance with the practice followed in the preparation of other plastic materials for molding, and having a no-strength temperature between about 420° F. and 625° F., is heated at a temperature between its conversion point and about 550° F. in the chamber of the extrusion machine and is extruded through a die land heated to a temperature between the conversion point and about 800° F. The invention, accordingly, comprises the several steps and the relation of one or more of such steps with respect to each of the others thereof which will be exemplified in the process hereinafter disclosed, and the scope of the invention will be indicated in the claims. The herein-described extrusion process and the apparatus suitable for carrying out this process, applies to plastics containing all, or a substantial quantity of polytrifluorochloroethylene, having no-strength temperatures in the range indicated.

The conversion or transition point is the temperature at which an opaque or powdered sample of the material becomes transparent as it is being heated. This temperature is substantially constant at 415 degrees plus or minus about 5 degrees Fahrenheit for normally solid polymers having no-strength temperatures in the 420–625° F. range and is usually determined by heating the sample under pressure between the platens of a press. Thus with such polymers, the no-strength temperature may vary but the conversion temperature remains the same. When a solid polymer is plasticized both the no-strength temperature and the conversion point are lowered, as this is one case where the conversion temperature is changed.

Inasmuch as the determination of the molecular weights of the higher polymers of trifluorochloroethylene is impractical under normal circumstances, a simple no-strength temperature (N. S. T.) test was devised to provide a measure of the relationship between the various polymers which is based on the temperature characteristics of the material—a matter of far greater importance than molecular weights in regard to the shaping, heat treating and thermal degradation characteristics of these particular polymers. Although the higher polymers have higher N. S. T. values, it is to be understood that the N. S. T.—molecular weight relationship is not a simple direct one. The test consists of determining the temperature at which essentially all strength properties of the particular polymer are lost. Uniform sample sizes and weight strains are used in all tests. The apparatus in which the tests are conducted comprises a 3" diameter brass block 5" long having a ¾" diameter concentric bore and a thermometer well communicating with the bore. The block is heated by a single winding of asbestos-covered nickel-chrome heating wire which extends the complete length of the block. The block is covered on all sides by a 1" thick layer of asbestos insulation containing suitable openings for the heating leads and the insertion of a thermometer as well as a ¼" diameter hole at the bottom. A glass graduate or test tube is placed below this hole with the mouth of the graduate in contact with the asbestos insulation. In determining the no-strength temperature of a particular specimen a 2" x ⅛" x 1/16" strip is cut from a 1/16" sheet and symmetrically center-notched with a sharp punch to provide a 1/16" x 3/64" minimum cross-section at the notched portion. A small weight is suspended approximately 4" below the lower end of the strip by a wire, this weight being selected so that the total weight from the notch down is 0.5 gram. Then the upper end of the test strip is fastened securely to a sample holder or vise. Next the test assembly is lowered into the vertically disposed bore of the brass block and adjusted to position the notch of the specimen centrally within and half way down the bore. With the apparatus assembled the weight hangs within the glass cylinder below the insulated assembly. Next a thermometer is inserted in the thermometer well, the heating coil is energized and the temperature of the block is brought up to a suitable starting level, such as 410° F. After the temperature has become constant, it is then raised at a steady rate of 2.7° F. per minute until the no-strength temperature is reached where the sample pulls apart at the notch and drops to the bottom of the glass cylinder. This simple test affords results which can be checked within about 4 to 6° F. as it is not highly sensitive to small variations in the thickness of the test strip. However, care should be exercised to cut a sharp clear notch in each side of the specimen. Differences of 10° F. in the no-strength temperature indicated by the thermometer are normally considered significant.

When heated to excessive temperature, trifluorochloroethylene polymers undergo thermal degradation or decomposition in which the individual molecules are cracked or depolymerized to lower polymers. This process appears to commence at approximately 518° F. but the rate of decomposition is extremely slow until the temperature has risen above about 550° F. As the temperature rises further, the decomposition rate continues to increase and the desirable properties of the plastic are lost unless the exposure to the higher temperature is extremely brief. Although the polytrifluorochloroethylene may be heated as high as 800° F. for a few seconds without substantial degradation, provided it is then rapidly cooled below 550° F., it is undesirable to maintain polymers with 420 to 625° F. N. S. T.'s above 550° F. for periods greater than a few minutes. While lower polymers decompose faster than higher polymers at any given temperature above about 518° F., the above remarks are generally applicable to the range of polymers mentioned.

The polymers of trifluorochloroethylene are amenable to heat treatment at temperatures ranging from their conversion points down about 115 degrees lower, that is, from 300 to 415° F. for solid polymers having N. S. T.'s of 420 to 625° F. Maintaining the material within this temperature range for a sufficient period, increases its hardness, brittleness, opacity and crystallinity. The treatment proceeds quite slowly in the lower half of the stated temperature range, hence only the upper portion of the range from the conversion point down about 60 degrees therefrom is of primary importance. Of this, the first 25° F. below the transition temperature is the most critical range and advantage is taken of this to select the characteristics of the molded article by either rapidly cooling or quenching the article through this range to maximize its flexibility, toughness and transparency or by slowly cooling it to promote hardness and opacity. In comparison with a slowly cooled or heat treated article, a quenched article has the appearance of a plasticized product without sacrifice of chemical inertness. Almost perfectly transparent articles up to ⅛" in thickness may be produced by quenching, but those of increasing thickness become more and more translucent, due to the insulating qualities of the plastic and the resulting slower cooling of the inner portions. A quenched article may be heat treated later by reheating it within the stated temperature range. For best control of the hardening at reasonable heat treating rates, it is preferred to reheat to temperatures of about 20 to 40 degrees below the conversion point. Polymers of low N. S. T. values may be heat treated at lower temperatures than the higher polymers, and the rate of hardening is faster at any given temperature. Enhanced dimensional stability of trifluorochloroethylene plastics can be procured by annealing articles at about 255° F. for 24 hours.

The accompanying drawing, is an elevational view, partly in cross-section, showing an example of an extrusion machine for carrying out the extrusion molding of either plasticized or unplasticized polytrifluorochloroethylene in accordance with the present process. As hereinafter described, the extrusion operation is carried out in a different manner from that commonly employed for other thermoplastic materials. It should be noted that the arrangement for heating the apparatus, at the various points indicated, may be modified, if so desired, to provide varying temperatures and application of heat at additional points. For best results, the extrusion machine should be provided with adequate temperature control equipment, particularly where temperatures in the higher regions of the stated ranges are employed in the molding operation.

The polytriflurochloroethylene is preferably preheated to a temperature between about 200° F. and about 350° F. prior to the molding operation. Such preheating may be performed within an oven, external to the extrusion machine and the heated plastic is then introduced into the feed hopper 10. Preferably, the plastic is preheated in feed hopper 10, by providing the latter with any suitable heating means, such as heating unit 11. The thus preheated polytrifluorochloroethylene plastic is next fed into the extrusion chamber or cylinder 12. Chamber 12 is provided with a worm screw 13. This worm screw is so designed that the molding material will pass through the extrusion chamber or cylinder in a rather thin layer. For this purpose, a screw with a shallow flight is recommended, and a screw with a gradualy decreasing flight depth is particularly desirable for this purpose.

The extrusion chamber 12 is provided with suitable heating means for maintaining proper operating temperatures for molding the plastic within this chamber. For this purpose, a single heating element may be employed for the entire extrusion chamber or cylinder. However, two or more heating elements, viz, 14 and 15, are more desirable, since this arrangement permits more gradual heating and shorter exposure of the plastic material to high temperatures. By means of these heating elements 14 and 15, the temperature of the plastic material in the rear-half of entrance section of the extrusion chamber is adjusted to a temperature between about 250° F. and about 350° F. In this connection, it should be noted that the temperature of the plastic material is fairly uniform throughout and approaches the temperature of the cylinder wall 16 within a few degrees, since the material is in contact with the cylinder wall for a relatively low period of time in comparison with the time of passage through the extrusion die 17 itself.

In the front half or exit section of the cylinder 12, the temperature is raised above the conversion point of the plastic material, but not above aproximately 550° F. To minimize thermal decomposition, it is preferred to hold the maximum temperature in the cylinder below about 500° F.; however, the temperature must be above the conversion point when the plastic reaches the entrance of the extrusion die 17. The land or straight exit portion of the extrusion die 17 is preferably maintained at the highest temperature of any part of the apparatus. Any temperature from the conversion point up to about 800° F. may be employed here. The best results, however, are obtained by maintaining the die land, of extrusion die 17, between about 10° F. and about 130° F. above the N. S. T. of the material being extruded. For this purpose, a heating device, independent of those on the extrusion or heating cylinder is recommended. Due to the short period of time which the plastic material is exposed to the land or exit end of the extrusion die 17, only its surface approaches the temperature level of the die land, and little thermal decomposition occurs, since the surface of the extruded section cools, sufficiently after leaving the extrusion die to avoid such decomposition. Moreover, a fairly high die land temperature serves to heat-polish the surface of the extruded section.

The appearance of the extruded profile from die 17 will determine whether the selected temperatures are excessive or insufficient to meet the molding requirements. When the temperatures are too low, the extruded section is rough, horny and displays a tendency to break easily. Material molded at excessive temperatures, contains numerous bubbles, and will, upon sufficient heat-aging, become excessively brittle. A check for possible thermal degradation can easily be made by determining the N. S. T. of the extruded product and comparing it with the original N. S. T., as substantially thermal decomposition lowers the N. S. T. A properly extruded profile possesses a high surface gloss, no bubbles, and has the characteristic toughness of polytrifluorochloroethylene. Within limits, either inadequate or excessive heating of the plastic material can be corrected by reducing or increasing the speed of the screw 13.

In carrying out the extrusion molding process of the present invention, the rate of cooling of the molded plastic material is of prime importance, in order to avoid case hardening of the outer surface and the formation of vacuum shrinkage bubbles or voids within the material itself. This cooling rate may be adjusted through the use of a second die 18 provided with cooling means 19 having suitable controls, so that careful adjustment of the cooling rate may be obtained. Cooling means 19 are provided with an inlet 20 and an outlet 21 so that a suitable refrigerant, such as water, air or other commercial refrigerants may be circulated through cooling means 19 and thus enable the operator to control the rate of cooling within die 18 itself.

It will be noted that cooling die 18 is directly attached to extrusion die 17 through a suitable gasket or insulating material 22 which is capable of withstanding the aforementioned molding temperatures without undergoing decomposition or deterioration, itself. It will also be noted that cooling die 18 is so constructed that the entrance portion of this die, while being of approximately the same cross-section or diameter as the exit section of extrusion die 17, is, however, larger in cross-section or diameter, preferably from about 15 to 25%, than the exit section of this cooling die. Thus, it will be seen that cooling die 18 is a tapered die, and is, therefore, particularly suited for maintaining pressure on the heated material emerging from die 17, while undergoing cooling within die 18 itself. In this connection, it has been found to be of importance that the pressure maintained on the heated material while undergoing cooling in die 18 should be at least initially not substantially lower than the extrusion pressure exerted on the material in die 17. The pressure maintained on the material in cooling die 18 will continue throughout the cooling operation, and usually will be maintained for such time as it takes the hot-molded material to pass through the cooling die, and depends in each instance upon the rate of take-off. However, it should also be noted that it is possible to vary the pressure maintained in cooling die 18, by proper adjustment of the cooling rate. However, in no case should the pressure be immediately dropped as the hot-molded material enters the cooling die 18. In all instances, pressure must be maintained on the material, in cooling die 18, which at least initially is not substantially lower than the extrusion pressure within die 17 itself.

It is preferred, in general, to quench or rapidly cool the extruded product in cooling die 18 below 300° F. and especially through the critical range extending from the conversion point to about 25° F. therebelow, since this will produce the transparent or translucent, amorphous and flexible articles generally desired. Where greater hardness, crystallinity and opacity are sought, the product should be cooled relatively slowly between its conversion point and temperatures from about 60° F. to about 115° F. lower, by any suitable cooling means. The extrusion pressures, under which the present process is carried out, vary from about 5,000 to about 10,000 pounds per square inch. However, any pressure may be employed which will not damage the equipment. The high melt viscosity of polytrifluorochloroethylene at the extrusion temperatures, exerts sufficient back-pressure to provide adequate mixing and to reduce pulsation to a minimum.

Inasmuch as polytrifluorochloroethylene is easily discolored by foreign matter, the cylinder wall 16, screw 13 and dies 17 and 18, are preferably made of stainless steel to avoid any discoloration by corrosion products, inasmuch as the relatively high operating temperatures tend to oxidize the comonomer construction material. Furthermore, it is recommended that the operator avoid handling the powdered or granulated polymer, since the organic material in perspiration will tend to decompose and darken the molding material upon being heated to high temperatures.

In starting a run with the polytrifluorochloroethylene material, the N. S. T. of the plasticized or unplasticized material is first determined. The heating elements should then be adjusted to provide the minimum temperatures in the preferred ranges, indicated above, for the particular polytrifluorochloroethylene plastic. The powdered or granulated material is introduced into the hopper 10 at a low screw speed of approximately 10 to 15 R. P. M. When the molding operation is proceeding satisfactorily, as determined by the appearance of the extruded section, the screw speed and temperature may be increased, as required, to attain the maximum production rate—the appearance of the product determining the balance between these factors. In general, it is preferred to carry out the extrusion at the lowest temperature, consistent with a satisfactory product and production rate. Screw speeds of 30 to 40 R. P. M. have been successfully employed. A standard take-off mechanism may be employed with the apparatus, however, the take-off belt should be capable of good standing temperatures between about 400° F. and about 500° F. for short periods. By following the procedure set forth, it has been found possible to extrude trifluorochloroethylene polymers in a wide variety of shapes and sizes to produce various useful articles, including bars, rods, tubes, films, coated wires, etc.

Since certain changes may be made in carrying out the above method, and in the apparatus employed, without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

I claim:

1. In a process for shaping in an extrusion machine a thermoplastic material comprising a trifluorochloroethylene polymer, the steps which comprise: heating said material; moving said heated material through an extrusion chamber; extruding said heated material through a die land at a predetermined extrusion pressure and extrusion temperature above its conversion point; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to at least about 25° F. therebelow.

2. In a process for shaping in an extrusion machine a thermoplastic material comprising a trifluorochloroethylene polymer, the steps which comprise: heating said material; moving said heated material through an extrusion chamber; extruding said heated material through a die land at a predetermined extrusion pressure and extrusion temperature above its conversion point; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to a temperature between about 60° F. and about 115° F. therebelow.

3. In a process for shaping in an extrusion machine a thermoplastic material comprising a trifluorochloroethylene polymer, the steps which comprise: heating said material; moving said heated material through an extrusion chamber; extruding said heated material through a die land at a predetermined extrusion pressure and extrusion temperature above its conversion point; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to a temperature below about 300° F.

4. In a process for shaping in an extrusion machine a thermoplastic material comprising a trifluorochloroethylene polymer having a no-strength-temperature between about 420° F. and about 625° F., the steps which comprise: heating said material to a temperature between its conversion point and about 550° F. while moving said heated material through an extrusion chamber; extruding said heated material through a die land at a temperature between the conversion point of said material and about 800° F.; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to at least about 25° F. therebelow.

5. In a process for shaping in an extrusion machine a thermoplastic material comprising a trifluorochloroethylene polymer having a no-strength-temperature between about 420° F. and about 625° F., the steps which comprise: heating said material to a temperature between its conversion point and about 550° F. while moving said heated material through an extrusion chamber; extruding said heated material through a die land at a temperature between the conversion point of said material and about 800° F.; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to a temperature between about 60° F. and about 115° F. therebelow.

6. In a process for shaping in an extrusion machine a thermoplastic material comprising a trifluorochloroethylene polymer having a no-strength-temperature between about 420° F. and about 625° F., the steps which comprise: heating said material to a temperature between its conversion point and about 550° F. while moving said heated material through an extrusion chamber; extruding said heated material through a die land at a temperature between the conversion point of said material and about 800° F.; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to a temperature below about 300° F.

7. In a process for shaping in an extrusion machine a thermoplastic material comprising a trifluorochloroethylene polymer having a no-strength-temperature between about 420° F. and about 625° F., the steps which comprise: heating said material to a temperature between its conversion point and about 550° F. while moving said heated material through an extrusion chamber; extruding said heated material through a die land at a temperature higher than the temperature in the extrusion chamber and between about 10° F. and about 130° F. above the no-strength-temperature of said material; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to at least about 25° F. therebelow.

8. In a process for shaping in an extrusion machine a thermoplastic material comprising a trifluorochloroethylene polymer having a no-strength-temperature between about 420° F. and about 625° F., the steps which comprise: heating said material to a temperature between its conversion point and about 550° F. while moving said heated material through an extrusion chamber; extruding said heated material through a die land at a temperature higher than the temperature in the extrusion chamber and between about 10° F. and about 130° F. above the no-strength-temperature of said material; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to a temperature between about 60° F. and about 115° F. therebelow.

9. In a process for shaping in an extrusion machine a thermoplastic material comprising a trifluorochloroethylene polymer having a no-strength-temperature between about 420° F. and about 625° F., the steps which comprise: heating said material to a temperature between its conversion point and about 550° F. while moving said heated material through an extrusion chamber; extruding said heated material through a die land at a temperature higher than the temperature in the extrusion chamber and between about 10° F. and about 130° F. above the no-strength-temperature of said material; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to a temperature below about 300° F.

10. In a process for shaping in an extrusion machine a thermoplastic material comprising a trifluorochloroethylene polymer having a no-strength-temperature between about 420° F. and about 625° F., the steps which comprise: heating said material to a temperature between about 200° F. and about 350° F. in the entrance section of an extrusion chamber; raising the temperature of said heated material to a temperature between its conversion point and about 300° F. in the exit section of said extrusion chamber; extruding said heated material through a die land at a temperature higher than the temperature in said extrusion chamber and between about 10° F. and about 130° F. above the no-strength-temperature of said material; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to at least about 25° F. therebelow.

11. In a process for shaping in an extrusion machine a thermoplastic material comprising a trifluorochloroethylene polymer having a no-strength-temperature between about 420° F. and about 625° F., the steps which comprise: heating said material to a temperature between about 200° F. and about 350° F. in the entrance section of an extrusion chamber; raising the temperature of said heated material to a temperature between its conversion point and about 300° F. in the exit section of said extrusion chamber; extruding said heated material through a die land at a temperature higher than the temperature in said extrusion chamber and between about 10° F. and about 130° F. above the no-strength-temperature of said material; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to a temperature between about 60° F. and about 115° F. therebelow.

12. In a process for shaping in an extrusion machine a thermoplastic material comprising a trifluorochloroethylene polymer having a no-strength-temperature between about 420° F. and about 625° F., the steps which comprise: heating said material to a temperature between about 200° F. and about 350° F. in the entrance section of an extrusion chamber; raising the temperature of said heated material to a temperature between its conversion point and about 300° F. in the exit section of said extrusion chamber; extruding said heated material through a die land at a temperature higher than the temperature in said extrusion chamber and between about 10° F. and about 130° F. above the no-strength-temperature of said material; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to a temperature below about 300° F.

13. In a process for shaping in an extrusion machine a thermoplastic material comprising a trifluorochloroethylene polymer, the steps which comprise: heating said material; moving said heated material through an extrusion chamber; extruding said heated material through a die land at a predetermined extrusion pressure and extrusion temperature above its conversion point; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to at least about 25° F. therebelow while maintaining pressure on said material in said second die which initially is not substantially lower than the extrusion pressure.

14. In a process for shaping in an extrusion machine a thermoplastic material comprising a trifluorochloroethylene polymer, the steps which comprise: heating said material; moving said heated material through an extrusion chamber; extruding said heated material through a die land at a predetermined extrusion pressure and extrusion temperature above its conversion point; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to a temperature between about 60° F. and about 115° F. therebelow while maintaining pressure on said material in said second die which initially is not substantially lower than the extrusion pressure.

15. In a process for shaping in an extrusion machine a thermoplastic material comprising a trifluorochloroethylene polymer, the steps which comprise: heating said material; moving said heated material through an extrusion chamber; extruding said heated material through a die land at a predetermined extrusion pressure and extrusion temperature above its conversion point; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to a temperature below about 300° F. while maintaining pressure on said material in said second die which initially is not substantially lower than the extrusion pressure.

16. In a process for shaping in an extrusion machine a thermoplastic material comprising a trifluorochloroethylene polymer having a no-strength-temperature between about 420° F. and about 625° F., the steps which comprise: heating said material to a temperature between its conversion point and about 550° F. while moving said heated material through an extrusion chamber; extruding said heated material through a die land at a temperature between the conversion point of said material and about 800° F.; passing said heated extruded material directly into and through a second die provided with cooling means, said second die having a cross-section not larger than the cross-section of said first die and being insulated from said first die, whereby transfer of heat from said first die is substantially reduced; and in said second die cooling said extruded material through a critical range extending from its conversion point to at least about 25° F. therebelow while maintaining pressure on said material in said second die which initially is not substantially lower than the extrusion pressure.

References Cited in the file of this patent

UNITED STATES PATENTS

| | | |
|---|---|---|
| 2,117,179 | Kopp | May 10, 1938 |
| 2,365,374 | Bailey | Dec. 19, 1944 |

FOREIGN PATENTS

| | | |
|---|---|---|
| 520,560 | Great Britain | Apr. 26, 1940 |
| 578,168 | Great Britain | June 18, 1946 |
| 685,043 | Great Britain | Dec. 31, 1952 |

OTHER REFERENCES

"New High Temperature Thermoplastic," Modern Plastics, Oct. 1948. Pages 168, 170 and 172.